United States Patent [19]

Long

[11] Patent Number: 5,193,940
[45] Date of Patent: Mar. 16, 1993

[54] MINE ROOF SUPPORT SYSTEM
[75] Inventor: Lawrence E. Long, Avon Lake, Ohio
[73] Assignee: Dyckerhoff & Widmann AG, Munich, Fed. Rep. of Germany
[21] Appl. No.: 749,323
[22] Filed: Aug. 23, 1991
[51] Int. Cl.$^5$ .............................................. E21D 21/00
[52] U.S. Cl. .................................... 405/259.1; 405/288
[58] Field of Search ........................ 405/288, 259, 303

[56] References Cited

U.S. PATENT DOCUMENTS

| 3,104,582 | 9/1963 | White . | |
|---|---|---|---|
| 3,211,044 | 10/1965 | White . | |
| 3,454,118 | 7/1969 | White | 175/289 |
| 3,505,824 | 4/1970 | White . | |
| 3,509,726 | 5/1970 | White . | |
| 3,555,960 | 1/1971 | White . | |
| 4,249,835 | 2/1981 | White | 405/259 |
| 4,596,496 | 6/1986 | Tyrell et al. | 405/259 |
| 4,601,616 | 7/1986 | Barish et al. | 405/288 |
| 4,666,344 | 5/1987 | Seegmiller | 405/288 X |
| 4,699,547 | 10/1987 | Seegmiller | 405/288 |
| 4,749,310 | 6/1988 | White | 405/259 X |
| 4,775,266 | 10/1988 | Seegmiller | 405/288 |
| 4,934,873 | 6/1990 | Calandra | 405/259 X |
| 5,026,217 | 6/1991 | Seegmiller | 405/288 |

Primary Examiner—Dennis L. Taylor
Attorney, Agent, or Firm—Marshall, O'Toole, Gerstein, Murray & Bicknell

[57] ABSTRACT

A roof support system is disclosed having a first rod extending into a first bore in the roof of a mine, a second rod extending into a second bore into the roof of a mine, a connector having a first hole through which the free end of the first rod is inserted and a second hole through which the free end of the second rod is inserted such that the first rod is held in securing fashion within the connector, and a nut threadably engaged to the second rod at an end of the second rod which exits the second hole of the connector, the connector and the rods forming a roof support system.

15 Claims, 2 Drawing Sheets

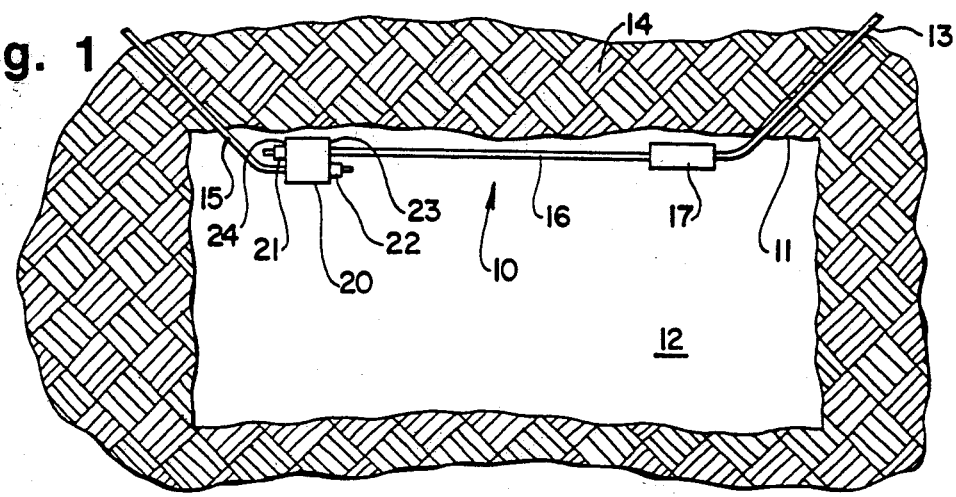
Fig. 1
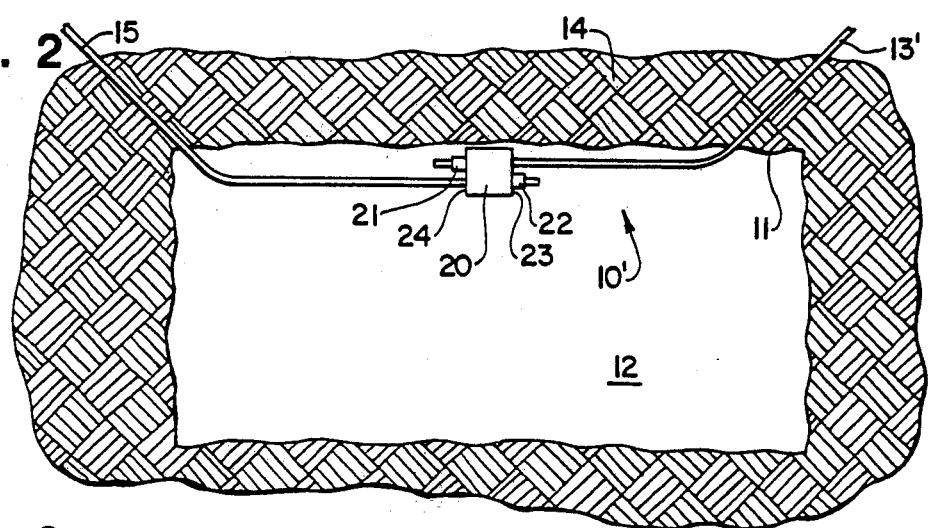
Fig. 2
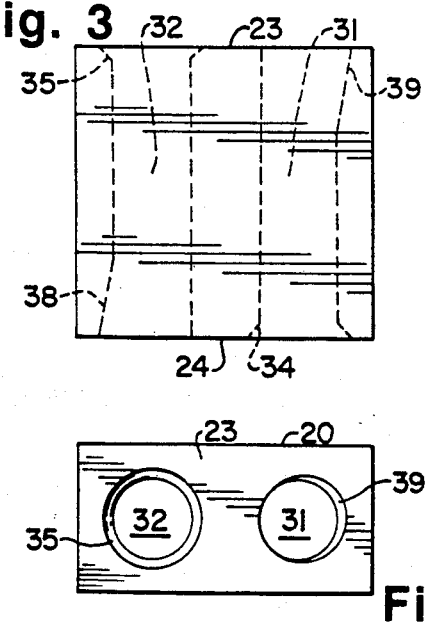
Fig. 3
Fig. 4
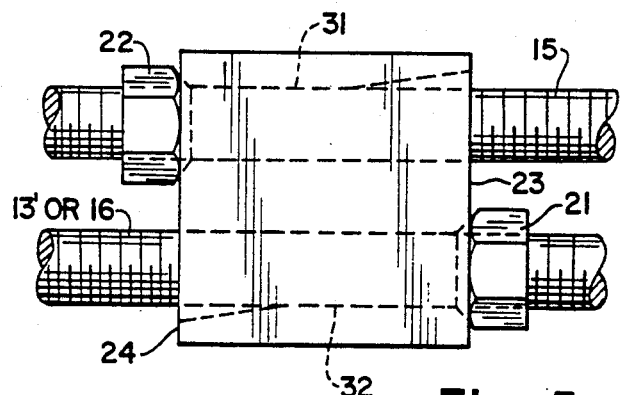
Fig. 5

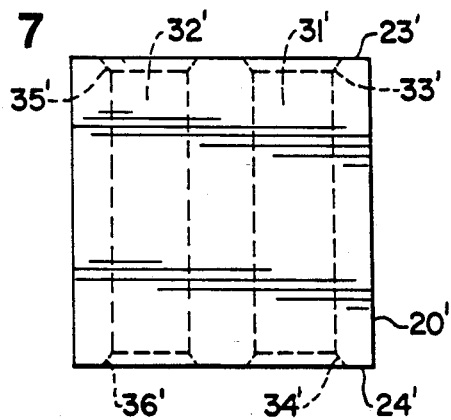
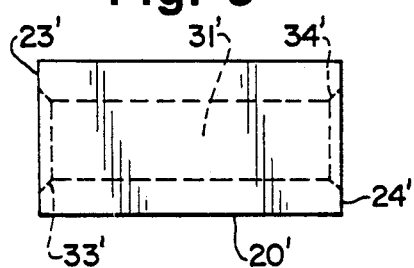
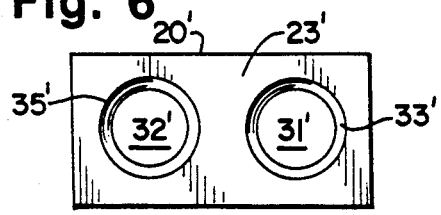
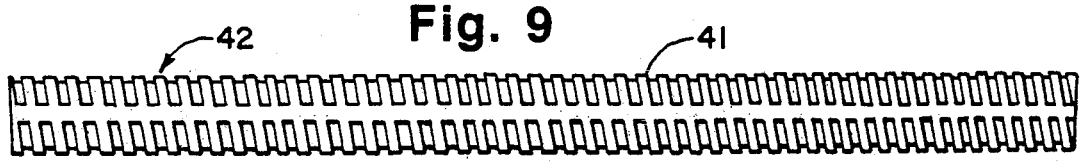
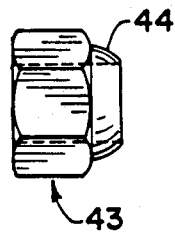

MINE ROOF SUPPORT SYSTEM

BACKGROUND OF THE INVENTION

The present invention relates to a mine roof support system for supporting the roof of a mine.

There are numerous methods other than vertical or angled roof bolting for supporting the roof of an underground mine which is dug for the extraction of coal or other minerals or ores. One such method is the crossbar method wherein wood, steel, rail, fiberglass, or aluminum beams are placed against a mine roof. Each end of the beam can be supported by posts made from any of the materials used in making the beams or, in addition, from concrete. The crossbar method has the disadvantage that the posts can be accidentally knocked out by moving machinery, thus endangering the miners. To protect miners in such situations, cable or steel straps are bolted into the roof in order to support the beam should a post be knocked out. The beams can also be drilled and bolted directly to the roof. Installing crossbars is a slow and labor-intensive process, the materials are expensive, and installation can be hazardous. Moreover, wood is not a permanent material even if it is treated.

In another method, continuous bolt trusses are fabricated from angled roof bolts anchored into the roof by mechanical shells or adhesive resins. The bolts are connected by means of a tie-rod and tension is produced by a turnbuckle. Tie-rods or other length compensating devices are connected in sections of from two to five connecting rods. The tension in the bolts and tie-rod is essentially equal as they are continuously connected together. Tightening of the tie-rod turnbuckle can produce compressive forces in the roof rock which increases the strength of the rock. However, as the turnbuckle length or take-up is limited, the roof bolt holes must be precisely located or otherwise various lengths of tie-rods must be available to be connected to the roof bolts and turnbuckles in order to allow the truss system to be tensioned. The threads, which are cut or rolled into the ends of the roof bolts and tie-rods, act as stress concentration points and also reduce the effective area of the bolt/tie-rod, thus reducing the effective ultimate strength of the system. Fine machine threads are subject to damage, rust, and corrosion. Assembly of the continuous bolt multi-segment tie-rod truss system is time-consuming.

In a third method, multiple angled bolt trusses are fabricated by securing one end of each of two bolts at angles in the roof of the mine and by passing the other ends of the two bolts through plates or brackets such that each bolt is tensioned separately. Tie-rods, in two to five sections, are connected to the plates or brackets using turnbuckles or tensioning bolts and couplers such that the turnbuckles or tensioning bolts can tension the tie-rods. Since the tie-rods and bolts are tensioned separately, the compressive forces on the roof rock may be unequal. This may result in one bolt being overloaded close to failure while the tie-rod and opposite bolt have little or no stress. The roof bolt holes must be located at precise distances to allow tensioning within the limited range of a turnbuckle or tensioning bolt or else several sections of various lengths of tie-rods must be available to achieve the proper tie-rod length. The threads which are cut or rolled into the threaded ends of the roof bolts and tie-rods act as stress concentration points, and also reduce the effective area of the bolt/tie-rod thus reducing the effective ultimate strength of the truss system. Fine machine threads are subject to damage, rust, and corrosion. Assembly of the roof truss system is time-consuming.

In a fourth method, cable bolts or slings of lengths of wire rope are inserted into bore holes in the roof of a mine on either side of the mine passageway. Grout or grout cartridges are inserted into the holes in order to secure the cables to the mine roof. As each cable is one continuous piece, the tension in each cable can be equal in all segments. The cable or sling can be tensioned by attaching it to a split tube and by driving the split tube up into the cement-filled bore hole by a split tube driver which can be an air or hydraulic impact tool. However, variations in bore hole diameter due to drilling and/or rock movement hinder the passage of the split tube such that there is little control of the tension on the cable or sling. After installation, some cables have no tension and must be blocked with wood to the roof and tightened with wedges. Also, the tubes require special air or hydraulic jack legs which are not normal coal mining equipment, thus requiring an air compressor and air hoses laid to the work area. Moreover, the impact driving of the split tubes is slow and very noisy, and requires three operators to install a cable sling. Furthermore, impact driving of the split tubes can disturb the roof and ribs and may dislodge material thus endangering miners.

SUMMARY OF THE INVENTION

These disadvantages can be eliminated and/or minimized by providing a roof support system having a first rod secured within a first bore extending into a mine roof and a second rod secured within a second bore extending into the mine roof. A connector has a connector body and first and second holes extending through the connector body from a first face to a second face. The first rod is inserted into the first hole through the first face and is secured to the connector. The second rod is inserted into the second hole through the second face and has an end exiting the second hole through the first face. A nut is threaded over this end of the second rod such that the connector and the nut hold the first and second rods together in order to support the roof of a mine.

In this system, there is no need for multiple tie-rods. A single nut can be used for tensioning the whole system and the tension anywhere in the roof support system is equalized. The rods are made sufficiently long such that precise location of roof bolt holes is not required because the system can easily accommodate any excess rod extending through the connector. The roof truss system according to the present invention has few parts and is easier and faster to assemble which is important because installation of a mine roof support system must follow as soon as possible after the extraction of rock, coal or other mineral, or ore in order to maintain roof rock strength and avoid roof falls.

BRIEF DESCRIPTION OF THE DRAWINGS

These and other features and advantages will become more apparent from a detailed consideration of the invention when taken in conjunction with the drawings in which:

FIG. 1 shows one arrangement of the roof truss system according to the present invention;

FIG. 2 shows another embodiment of a roof truss system according to the present invention;

FIGS. 3 and 4 illustrate one embodiment of a connector such as that used in FIGS. 1 and 2;

FIG. 5 shows the connector of FIGS. 3 and 4 attached to roof supporting rods;

FIGS. 6, 7 and 8 illustrate a second embodiment of a connector such a that used in FIGS. 1 and 2;

FIG. 9 is one rod which can be used for the rods of the roof truss systems shown in FIGS. 1 and 2; and FIG. 10 shows an adjusting and tensioning nut which can be used in connection with the roof truss systems shown in FIGS. 1 and 2.

DETAILED DESCRIPTION

In FIG. 1, roof truss system 10 supports roof 11 of passage 12 of a mine. A typical mine would incorporate a plurality of such roof truss systems 10 each separated by a predetermined distance from the system on either side of it. Roof truss system 10 includes first rod 13 which is inserted into a bore formed at an angle through roof 11 and into roof rock 14. Any suitable means such as an anchor, epoxy resin, or cement can be used to retain first rod 13 in its bore. Second rod 15 is inserted into a bore, spaced oppositely to the bore which receives rod 13, formed at an angle through roof 11 and into roof rock 14. Second rod 15 may be of unitary construction; that is, rod 15 is a single rod. Second rod 15 can be secured within its bore by any suitable means such as an anchor, epoxy, or cement. Rod 13 is secured to tie-rod 16 by connector 17 such that rod 13 and tie-rod 16 are screwed into opposite ends of connector 17. The other end of tie-rod 16 is inserted into a first hole of connector 20 through first connector face 23. Tie-rod 16 can be secured to connector 20 by any suitable mechanism such as threads within the first hole of connector 20 or nut 21. Second rod 15 is inserted into a second hole in connector 20 through second connector face 24 and has a threaded end which exits connector 20 through first face 23. Nut 22 is threaded over this threaded end and can be adjusted against connector 20 in order to create the desired amount of tension in rod 13, rod 15, and tie-rod 16. If a precise amount of tension is required, a torque wrench can be used for tightening nut 22. Connector 17 can be replaced by a connector such as connector 20.

In an alternative embodiment, tie-rod 16 and connector 17 are eliminated And rod 13' of extended length is used in their place. Rod 13' is secured to connector 20 by inserting rod 13' into the first hole of connector 20 through first face 23 such that a threaded end of rod 13' exits second face 24. Nut 21 is then threaded onto the threaded end of rod 13'. Rod 13' can be of unitary construction. Otherwise, the construction of the roof truss system 10' is the same as that shown in FIG. 1.

Connector 20 is shown in more detail in FIGS. 3-5. Connector 20 has a first hole 31 extending through connector 20 so that it creates openings in both first face 23 and second face 24. Connector 20 also has a second hole 32 extending through connector 20 so that it creates openings in both first face 23 and second face 24. Hole 31 has a beveled rim 34 in second face 24 but an elliptical hole in first face 23 forming a partially beveled rim 39. Similarly, hole 32 has a beveled rim 35 in first face 23 but an elliptical hole in second face 24 forming a partially beveled rim 38. Partially beveled rims 38 and 39 allow twisting of the roof truss system in order to relieve strain therein. Fully beveled rims 34 and 35 accommodate spherical faces of nuts 21 and 22.

As shown in FIG. 5, rod 13' or 16 is inserted through first face 23, hole 32 and exits second face 24. Nut 21 is threaded onto rod 13' or 16. Rod 15 is inserted through second face 24, hole 31 and exits first face 23. Nut 22 is threaded overrod 15. Either nut can then be tightened to place the prescribed tension on rods 15 and 13' or 16.

As an alternative embodiment, connector 20' is shown in more detail in FIGS. 6-8. Connector 20' has a first hole 31' extending through connector 20' so that it creates openings in both first face 23' and second face 24'. Connector 20' also has second hole 32' extending through connector 20' so that it creates openings in both first face 23' and second face 24'. Hole 31' has a beveled rim 33 in first face 23' and beveled rim 34' in second face 24'. Similarly, hole 32' has a beveled rim 35' in first face 23' and a beveled rim 36 in second face 24'. These beveled rims are provided for each hole in each face in order to allow connector 20' to be a bidirectional device, to receive a spherical nut and to facilitate twisting of the truss system in order to relieve strain.

Rod 41 is shown in more detail in FIG. 9. Rod 41 can be used for any of the rods shown in the roof support system of FIGS. 1 and 2. Rod 41 has threads 42 which may extend, although not necessarily so, along the entire length of rod 41 and, if so, may be supplied under the mark THREADBAR by Dywidag. As shown in FIG. 9, threads 42 are partial threads which will accommodate a nut but which will allow at least some of the threads to be stripped in response to excessive loads on the roof support system in order to impede catastrophic failures of the roof support system.

FIG. 10 shows a nut 43 having a spherical face 44 to be used as either one or both of the nuts 21 and 22 shown in FIGS. 1 and 2.

Accordingly, one end of rod 41 is inserted into a suitable bore in the roof of a mine and secured therein. Threaded end 42 of rod 41 is inserted into first hole 31 or 31' through first face 23 or 23' of connector 20 or 20'. The threaded end can be secured by use of threads within hole 31 or 31' or, in the preferred embodiment, passed through hole 31 or 31' so that at least a portion of threaded end 42 extends out of second face 24 or 24' of connector 20 or 20'. A nut 43 is inserted over the portion of threaded end 42 which extends out of connector 20 or 20' until spherical face 44 engages beveled rim 34 or 34'. A second rod 41 is suitably secured within a second bore extending through mine roof 11. Threaded end 42 of the second rod 41 is inserted through second face 24 or 24' into second-hole 32 or 321 in connector 20 or 20' until at least a portion of threaded end 42 exits connector 20 or 20' through first face 23 or 23'. A second nut 43 is then threaded over threaded end 42 until spherical face 44 engages beveled rim 35 or 35'. Either of the two nuts can then be adjusted to adjust the tension in the roof support system.

The system according to this invention is simple having only five parts in the system shown in FIG. 2 and seven parts with respect to the system shown in FIG. 1. A single nut is adjusted for adjusting the tension in the entire-system so that the tension will be equal everywhere in the roof support system. Precise location of the bore holes in the mine roof is not required since a deviation in the distance between the bore holes securing rods 13 and 15 is accommodated by the amount of extra rod extending through connector 20. Accordingly, rods of different length do not have to be inventoried, thus reducing cost.

Although FIGS. 1 and 2 do not show any supporting plates between the roof support system and the roof, it may be desirable to use such plates in order to provide contact between roof support system 10 and roof 11.

What I claimed is:

1. A roof support system for supporting a roof of a mine, said roof having first and second bores extending into said roof, said roof support system comprising:

first rod means having a first rod portion secured within said first bore and a second rod portion extending into said mine;

second rod means having a first rod portion secured within said second bore and a second rod portion extending into said mine;

connector means having a connector body with first and second faces, said connector body having only two holes extending between said first and second faces, said second rod portion of said first rod means extending into a first of said holes through said first face and having an end exiting said first hole through said second face, and said second rod portion of said second rod means extending into the second of said holes through said second face and having an end exiting said second hole through said first face;

a first nut threaded over said end of said second portion of said first rod means; and, a second nut threaded over said end of said second portion of said second rod means, wherein said connector means and said first and second nuts hold said first and second rod means together in roof supporting fashion.

2. The roof support system of claim 1 wherein said first hole has a beveled rim in the second side face and said second hold has a beveled rim in said first side face, said nuts threaded over said ends of said second portions of said first and second rod means, each of said nuts having spherical ends engaging said beveled rims.

3. The roof support system of claim 2 wherein said first hole has an elliptical opening with a partially beveled rim in said first side face and said second hole has an elliptical opening with a partially beveled rim in said second side face.

4. The roof support system of claim 1 wherein said first hole through said body of said connector means has at least a partially beveled rim in said first side face, and said second hole through said body of said connector means has at least a partially beveled rim in said second side face, said at least partially beveled rims allowing said connector means to twist to relieve strain on said roof support system.

5. The roof support system of claim 1 wherein said first and second rod means comprise corresponding first and second rods each being of unitary construction.

6. A method of supporting a roof of a mine, said method comprising the following steps:

forming first and second bores in said roof of said mine;

securing a first end of a first rod means in said first bore;

securing a first end of a second rod means in said bore; and, fastening only said first and second rod means to a connector by inserting a second end of said first rod means through a first face of said connector and through a first hole of said connector so that a portion of said second end of said first rod means exits said connector through a second face of said connector, by inserting a second end of said second rod means through said second face and through a second hole of said connector so that a portion of said second end of said second rod means exits said connector through said first face, by threading a first nut onto said portion of said second end of said first rod means which exits said connector through said second face of said connector, and by threading a second nut onto said portion of said second end of said second rod means which exits said connector through said first face of said connector;

wherein said first and second rod means and said connector form a roof support for said roof of said mine.

7. The method of claim 6 wherein the step of threading a nut onto said portion of said threaded end of said second rod means which exits said first face comprises the step of threading a nut having a spherical face onto said portion of said threaded end of said second rod means which exits said first face so that said spherical face engages a beveled rim of said second hole and said step of threading a nut onto said portion of said threaded end of said first rod means which exits said second face comprises the step of threading a nut having a spherical face onto said portion of said threaded end of said first rod means which exits said second face so that said spherical face of said nut threaded to said first rod means engages a beveled rim of said first hole.

8. A roof support system for supporting a roof of a mine, said roof having first and second bores into said roof, said roof support system comprising:

first rod means having a first rod portion secured within said first bore and a second rod portion extending into said mine;

second rod means having a first rod portion secured within said second bore and a second rod portion extending into said mine;

connector means having a connector body with first and second faces, first and second holes through said body extending from said first face to said second face, said first hole through said connector body having a partially bevelled rim forming an elliptical opening in said first face and said second hole through said connector body having a partially bevelled rim forming an elliptical opening in said second face, said partially bevelled rims allowing said connector means to twist to relieve strain on said roof support system; and, securing means for securing said second rod portions of said first and second rod means to said connector.

9. The roof support system of claim 8 wherein said second rod portion of said first rod means extends into said first hole through said first face and has an end exiting said first hole through said second face, wherein said second rod portion of said second rod means extends into said second hole through said second face and has an end exiting said second hole through said first face, and wherein said securing means comprises a first nut threaded over said end of said second portion of said first rod means and a second nut threaded over said end of said second portion of said second rod means, wherein said connector means and said first and second nuts hold said first and second rod means together in roof supporting fashion.

10. The roof support system of claim 9 wherein said first hole has a bevelled rim in the second face and said second hole has a bevelled rim in said first face and wherein each of said first and second nuts has a spherical end engaging a respective one of said bevelled rims in said respective second and first faces.

11. A roof support system for supporting a roof of a mine, said roof having first and second bores into said roof, said roof support system comprising:
- first rod means having a first rod portion secured within said first bore and a second rod portion extending into said mine;
- second rod means having a first rod portion secured within said second bore and a second rod portion extending into said mine;
- connector means having a connector body with first and second faces, a first hole through said body extending from said first face to said second face, and a second hole through said body extending from said first face to said second face, said second rod portion of said first rod means being threadably secured within said first hole through said first face, said second rod portion of said second rod means extending into said second hole through said second face and having an end exiting said second hole through said first face; and,
- a nut threaded over said end of said second portion of said second rod means, wherein said connector means and said nut hold said first and second rod means together in roof supporting fashion.

12. The roof support system of claim 11 wherein said second hole has a bevelled rim in said first face and wherein said nut has a spherical end engaging said bevelled rims in said first face.

13. The roof support system of claim 11 wherein said first hole is threaded.

14. The roof support system of claim 11 wherein said second rod portion of said first rod means is threaded.

15. The roof support system of claim 11 wherein both said first hole and said second rod portion of said first rod means are threaded.

* * * * *